United States Patent
Eadara et al.

(10) Patent No.: US 6,734,263 B2
(45) Date of Patent: May 11, 2004

(54) NON-POLYVINYL CHLORIDE, INTERPENETRATING NETWORK EPOXY/URETHANE ACRYLATES

(75) Inventors: Rajan Eadara, Ann Arbor, MI (US); Roy P. Jacob, Troy, MI (US); Yushin Ahn, Farmington Mills, MI (US); Biju Philip, Sterling Heights, MI (US); Jori Joseff, Mount Pleasant, SC (US)

(73) Assignee: Diversified Chemical Technologies, Inc., Detroit, MI (US)

(*) Notice: Subject to any disclaimer, the term of this patent is extended or adjusted under 35 U.S.C. 154(b) by 0 days.

(21) Appl. No.: 10/126,197

(22) Filed: Apr. 19, 2002

(65) Prior Publication Data

US 2003/0119987 A1 Jun. 26, 2003

Related U.S. Application Data

(60) Provisional application No. 60/284,989, filed on Apr. 19, 2001.

(51) Int. Cl.$^7$ .............................................. C08G 18/04
(52) U.S. Cl. ..................... 525/452; 523/445; 523/457; 523/458; 523/466; 523/468; 525/528; 525/529; 525/920; 528/121; 528/123
(58) Field of Search ................. 523/445, 457, 523/458, 466, 468; 525/452, 528, 529, 920; 528/121, 123

(56) References Cited

U.S. PATENT DOCUMENTS

| 4,380,613 A | 4/1983 | Nativi .......................... 525/440 |
| 4,694,052 A | 9/1987 | Hirose et al. ................ 525/454 |
| 4,755,571 A | 7/1988 | Irving et al. ................. 525/532 |
| 4,886,842 A | 12/1989 | Drain et al. ................. 522/103 |
| 5,106,945 A | 4/1992 | Hare ........................... 528/332 |
| 5,139,857 A | 8/1992 | Herndon et al. ............. 428/220 |
| 5,232,996 A | 8/1993 | Shah et al. ................... 525/452 |
| 5,334,654 A | 8/1994 | Starner et al. ............... 524/849 |
| 5,426,169 A | 6/1995 | Starner ........................ 528/103 |
| 5,435,842 A | 7/1995 | Mukaida et al. ............ 106/672 |
| 5,670,006 A | 9/1997 | Wilfong et al. ............. 156/236 |
| 5,891,367 A | 4/1999 | Basheer et al. ............. 252/514 |
| 6,054,536 A | 4/2000 | Brown et al. ................ 525/107 |
| 6,153,709 A | 11/2000 | Xiao et al. ................... 525/528 |
| 6,214,460 B1 | 4/2001 | Bluem et al. ......... 428/355 AC |
| 6,261,682 B1 | 7/2001 | Law ........................... 428/343 |
| 6,281,321 B1 | 8/2001 | Kelly et al. ................... 528/17 |
| 6,337,384 B1 | 1/2002 | Loy et al. ................... 528/393 |

FOREIGN PATENT DOCUMENTS

EP    0 477 840 B1    12/1999

OTHER PUBLICATIONS

Huntsman Corporation Technical Bulletin for Jeffamine D–2000 Polyoxypropylenediamine [CAS 9046–10–0], Copyright 1987, 1994.
Japanese Patent Abstract: JP 4–149443, May 22, 1992.
Japanese Patent Abstract JP 4–149444, May 22, 1992.
Japanese Patent Abstract JP 52–140590, Nov. 24, 1977.
Japanese Patent Abstract JP 60–163911, Aug. 26, 1985.
Japanese Patent Abstract JP 61–16970, Jan. 24, 1986.
Japanese Patent Abstract JP 63–311306, Dec. 20, 1988.

*Primary Examiner*—Robert Dawson
*Assistant Examiner*—D. Aylward
(74) *Attorney, Agent, or Firm*—Gifford, Krass, Groh, Sprinkle, Anderson & Citkowski, P.C.

(57) ABSTRACT

The present invention provides a polymeric material and a process for making the polymeric material. The polymeric material has adhesive and noise abatement properties over a broad temperature range. Further, the material is chip and corrosion resistant and provides metal panel reinforcement.

26 Claims, No Drawings

NON-POLYVINYL CHLORIDE, INTERPENETRATING NETWORK EPOXY/URETHANE ACRYLATES

RELATED APPLICATION

This application claims priority of U.S. Provisional Patent Application No. 60/284,989 filed Apr. 19, 2001, which is incorporated herein by reference.

FIELD OF THE INVENTION

The invention relates to polymeric materials. More specifically, the invention relates to non-polyvinyl chloride interpenetrating polymer network materials comprising epoxy urethane acrylates.

BACKGROUND OF THE INVENTION

Noise, vibration and harshness (NVH) that occurs during motor vehicle movement detracts from the consumer's enjoyment of driving and riding in the vehicle. The automotive industry is continually expending considerable money and effort searching for solutions to the problems posed by NVH.

A commonly explored remedy is application of an NVH damping composition to vehicle components. An optimal composition for reducing vehicle NVH must adhere to materials such as E coated metal, cast iron, aluminum and oily steel. Application of such a composition may be required at any stage of vehicle assembly, and thus should be in a suitable form such as paintable, pumpable, extrudable as a bead, swirl sprayable or airless sprayable. Importantly, an optimal composition requires uniform sound absorption over wide temperature ranges experienced during vehicle construction, coating, transport, storage and use.

Presently available compositions applied to reduce NVH problems have disadvantages including short shelf life, limited use conditions, relatively low adhesive strength and impact resistance and required use of volatile organic compounds in synthesis or application. Further, multiple compositions are often required for different NVH reducing applications such as seam sealing, NVH patches or body reinforcement. This limitation increases cost due to multiple formulation requirements and the necessity of duplicative application equipment. Thus, there is a continuing need for a composition providing effective NVH damping.

SUMMARY OF THE INVENTION

A composition that forms a non-polyvinyl chloride interpenetrating polymer network material with insulating and adhesive properties when cured is provided. A curable composition is provided that includes a resin component and a hardener component wherein the resin component includes an acrylated urethane oligomer and a liquid epoxy resin; and the hardener component includes an amine. Optionally, the resin, the hardener or both include a filler. The resin component may further include an epoxy silane, a flexible liquid epoxy resin, a reactive flexible epoxy diluent and a combination thereof. The hardener component may further include an accelerator, a heat-activated latent curing agent and a combination thereof.

An inventive process is provided for making a cured material including the steps of providing a resin component comprising an acrylated urethane oligomer and a liquid epoxy resin; providing a hardener component comprising an amine; mixing the resin component and the hardener component to obtain a curable composition; and incubating the curable composition at a temperature for a time sufficient for a cure reaction to occur. Optionally, the resin component, the hardener component or both include a filler. The resin component may further include an epoxy silane, a flexible liquid epoxy resin, a reactive flexible epoxy diluent and a combination thereof. The hardener component may further include an accelerator, a heat-activated latent curing agent and a combination thereof. Typically, the composition is cured at a temperature ranging from 15° C. to 250° C.

DETAILED DESCRIPTION OF THE INVENTION

The present invention provides compositions for a curable material which forms a non-polyvinyl chloride interpenetrating polymer network.

An interpenetrating network, formed by curing a mix of different types of monomers, provides synergistic advantages over the individual polymers. (Interpenetrating Polymer Networks, Klemper, D., Sperling, L. H. and Utraki, L. A., Eds., American Chemical Society Advances in Chemistry Series No. 239, 1994) For example, a curable composition of the present invention forms an interpentrating network having uniform sound absorption over a wide temperature range, improved sound absorption for the same thickness ratio compared to other traditional materials and improved corrosion resistance. An inventive curable composition has the advantage of allowing versatility in choosing a cure method, a room temperature, elevated temperature or combination cure being effective. An interpenetrating network formed by curing an inventive composition further provides enhanced non-fogging properties, abrasion resistance, stone chip resistance, adhesion and flexural strength.

A polymeric material is formed by combining a resin component and a hardener component and curing the mixture. A curable composition comprises: a urethane acrylate, a reactive epoxy compound and a reactive amine compound. The curing of the polymeric material is achieved by reaction of epoxy groups and urethane acrylates with amine functionalities. Epoxy groups suitable for formation of the polymeric material are provided by various compounds illustratively including epoxy silane, liquid epoxy resin, flexible liquid epoxy resin and reactive flexible epoxy diluent.

Simultaneous cure rates of epoxy and urethane acrylate are controlled by the amine ratio to form an interpenetrating polymer network. The material is adhesive and some illustrative applications include insulation from, for example, noise, vibration or harshness; reinforcing agent; seam filling and binding of components. It is an aspect of the present invention that the curable material is pumpable.

As used herein the term "flexible liquid epoxy resin" is intended to mean an epoxy resin modified to provide flexibility in the cured network. For example, an epoxy resin is adducted with a reactive liquid rubber. In one embodiment of this, an oxirane group of an epoxy resin is reacted with a carboxyl terminated liquid nitrile rubber forming an epoxy ester. In another illustrative example, an epoxy resin is reacted with flexible diols such as propylene glycol or dipropylene glycol resulting in an epoxy with butoxy or propoxy side chains. In a further example, dimerized fatty acids are reacted with epoxy to form an epoxy ester which provides flexibility in the compositions of the present invention.

As used herein the term "reactive flexible epoxy diluent" is intended to mean an epoxy-based diluent that acts to reduce viscosity of the resin for ease of application before curing and that cross links as normal epoxy when mixed with hardener. An example of a flexible reactive epoxy diluent is a mono or di-functional epoxy of aliphatic or aromatic hydrocarbons with chain length greater than three carbons, branched or as substitutes on the aromatic ring.

As used herein the term "heat-activated latent curing agent" is intended to mean that curing agent is activated with heat to cure the resin while it remains stable at room temperature or below room temperature.

As used herein the term "flexible amidoamine" is intended to mean long chain amine with amid linkages on the backbone and blended with compatible aliphatic amine.

As used herein the term "flexible amine" is intended to mean an amine with ether linkages on the backbone.

As used herein the term "modified amine" is intended to mean an amine blended with bisphenol A and/or alkyl phenols to accelerate the amine epoxy reaction.

As used herein the term "hydrocarbon diluent" is intended to mean non-reactive viscosity modifier.

As used herein the term "flexible polyamide" is intended to mean amine terminated polymer with amide linkages.

A curable composition of the present invention includes a resin and a hardener. The resin includes an epoxy resin and an acrylated urethane oligomer; and the hardener includes a reactive amine.

A curable mixture composition of the present invention includes resin and hardener components where the resin component includes an epoxy silane, an acrylated urethane oligomer, a liquid epoxy resin, a flexible liquid epoxy resin, a reactive flexible epoxy diluent and a first filler; and the hardener component includes a reactive anine and a second filler.

In a preferred embodiment, the resin component includes an epoxy silane, an acrylated urethane oligomer, a liquid epoxy resin, a flexible liquid epoxy resin, a reactive flexible epoxy diluent, and a first filler and the hardener component includes a high molecular weight polyether amine, a reaction accelerator, an epoxy amine adduct, a heat-activated latent curing agent, and a second filler.

In a second preferred embodiment, the resin component includes an epoxy silane, an acrylated urethane oligomer, a liquid epoxy resin, a flexible liquid epoxy resin, a reactive flexible epoxy diluent, and a filler and the hardener component includes a high molecular weight polyether amine, a reaction accelerator, an epoxy amine adduct, a heat-activated latent curing agent, and a filler.

In a third preferred embodiment, the resin component includes an epoxy silane, an acrylated urethane oligomer, a liquid epoxy resin, a flexible liquid epoxy resin, a reactive flexible epoxy diluent, and a filler and the hardener component comprises a flexible amidoamine, a flexible amine, a modified amine, a includes diluent, and a filler.

In a fourth preferred embodiment, the resin component includes an epoxy silane, an acrylated urethane oligomer, a liquid epoxy resin, a flexible liquid epoxy resin, a reactive flexible epoxy diluent, and a filler and the hardener component includes a standard polyamide, a reaction accelerator, a flexible amine, a modified amine and a filler.

In a fifth preferred embodiment, the resin component includes an epoxy silane, an acrylated urethane oligomer, a liquid epoxy resin, a flexible liquid epoxy resin, a reactive flexible epoxy diluent, and a filler and the hardener component includes a flexible polyamide, a reaction accelerator, a modified amine, an epoxy amine adduct, and a filler.

In a further preferred embodiment, the resin component includes urethane acrylate, a liquid epoxy resin, a flexible epoxy resin, and a filler and the hardener component includes a flexible amine, a reaction accelerator, a catalyst and a filler.

An epoxy silane is present in amounts ranging from 0.05% to 5% weight/weight. More preferably, the epoxy silane is present in amounts ranging from 0.1% to 1% weight/weight. In a preferred embodiment, the epoxy silane is Dynasylan Glymo 6720, available from Creanova, Inc.

An acrylated urethane oligomer is present in amounts ranging from 2% to 20% weight/weight. More preferably, the acrylated urethane oligomer is present in amounts ranging from 2.5% to 10% weight/weight. Still more preferably, the acrylated urethane oligomer is present in amounts ranging from 3% to 6% weight/weight. In a preferred embodiment, an acrylated urethane oligomer has a molecular weight in the range of 100 to 10,000 and an equivalent weight in the range of 20 to 2000. In a more preferred embodiment an acrylated urethane oligomer has a molecular weight in the range of 500 to 5000 and an equivalent weight in the range of 80 to 900. In a still more preferred embodiment acrylated urethane oligomer has a molecular weight in the range of 750 to 1500 and an equivalent weight in the range of 100 to 300. In a yet more preferred embodiment, the acrylated urethane oligomer is Ebecryl 220, available from UCB Chemicals Corp. or an equivalent from another supplier, such as Sartomer.

A liquid epoxy resin is present in amounts ranging from 10% to 40% weight/weight. More preferably, the liquid epoxy resin is present in amounts ranging from 15% to 30% weight/weight. The choice and concentration of a liquid epoxy resin according to the present invention depends on resin characteristics illustratively including molecular weight, equivalent weight and viscosity. In a preferred embodiment the liquid epoxy resin has a molecular weight in the range of 300 to 1000 and an equivalent weight in the range of 150 to 500. In a more preferred embodiment the liquid epoxy resin is DER 331, available from Dow Chemical Company, NPEL 128 available from Nanya, or an equivalent from another supplier such as Vantico. Mixtures of liquid epoxy resins are optionally included in an inventive curable composition.

A flexible liquid epoxy resin is present in amounts ranging from 0.5% to 10% weight/weight. More preferably, the flexible liquid epoxy resin is present in amounts ranging from 1% to 5% weight/weight. In a preferred embodiment the flexible liquid epoxy resin has a molecular weight in the range of 500 to 1000 and an equivalent weight of 250 to 500. In a preferred embodiment the flexible liquid epoxy resin is XB 4122, available from Vantico, Inc. A further example of a preferred flexible liquid epoxy resin includes Cardolite NC-514, available from Cardolite and equivalents recognized in the art.

A reactive flexible epoxy diluent is present in amounts ranging from 2% to 10% weight/weight. More preferably, the reactive flexible epoxy diluent is present in amounts ranging from 3% to 7% weight/weight. In a preferred embodiment the reactive flexible epoxy diluent has a molecular weight in the range of 100 to 500 and an equivalent weight of 50 to 250. In a preferred embodiment the reactive flexible epoxy diluent is Erisys GE21, available from CVC Specialty Chemicals.

An amine included in a hardener component of an inventive curable composition is typically a primary or secondary amine and illustratively includes, a primary or secondary aliphatic amine, an alicyclic amine, a primary aromatic amine, a high molecular weight polyether amine, an epoxy amine adduct, an amidoamine, a flexible amidoamine, a flexible amine, a modified amine, a polyamide, a flexible polyamide and a combination thereof.

Illustrative examples of suitable amines include ethylenediamine, diethylenetriamine, triethylenetetramine, dipropylenetriamine, dimethylamino-propylamine, diethylaminopropylamine, hexamethylenediamine, 1,2-propylenediamine, 1,3-propylenediamine, 2,2,4-(or 2,4,4-)trimethylhexa-methylenediamine, polypropylenepolyamine, dipropylenetriamine and polyoxypropylene polyamines such as Jeffamine D-2000, N-aminoethylpiperazine, piperazines, 1,3-bisaminocyclohexylamine (1,3-BAC), isophoronediamine, 1-cyclohexylamino-3-aminopropane, 1,4-diaminocyclohexane, di(aminocyclohexyl)methane, 1,3-di(aminocyclohexyl)propane, 2,4-diaminocyclohexane, N,N'-diethyl-1,4-diaminocyclohexane and 3,3'-dimethyl-4,4'-diaminocyclohexylmethane, m-xylylenediamine and p-xylylenediamine.

In a preferred embodiment a flexible amine is present in amounts ranging from 0.025% to 30% weight/weight. More preferably, the flexible amine is present in amounts ranging from 0.5% to 20% weight/weight. In an embodiment in which a flexible amine is the predominant reactive amine in the hardener, the preferred concentration is higher, ranging from 10% to 40% weight/weight. In a preferred embodiment the flexible amine has an equivalent weight of 204. An example of a commercially obtainable flexible amine is Ancamine 2390, available from Air Products and Chemicals, Inc.

A subclass of flexible amines includes high molecular weight polyether amines. A high molecular weight polyether amine is present in amounts ranging from 20% to 40% weight/weight. More preferably, the high molecular weight polyether amine is present in amounts ranging from 28% to 38% weight/weight. In a preferred embodiment the high molecular weight polyether amine has a molecular weight in the range of 1500 to 10,000 and an equivalent weight of 375 to 2,500. In a preferred embodiment the high molecular weight polyether amine is Jeffamine® D2000, available from Huntsman.

An epoxy amine adduct is present in amounts ranging from 0.05% to 5% weight/weight. More preferably, the epoxy amine adduct is present in amounts ranging from 0.1% to 2% weight/weight. In a preferred embodiment the epoxy amine adduct has an equivalent weight of 100 to 200. In a preferred embodiment the epoxy amine adduct is Epicure 3270, available from Shell Chemical Co.

In a preferred embodiment a flexible amidoamine is present in amounts ranging from 1% to 20% weight/weight. More preferably, the flexible amidoamine is present in amounts ranging from 5% to 10% weight/weight. In a preferred embodiment the flexible amidoamine has an equivalent weight of 68. An example of a commercially obtainable flexible amidoamine is Ancamide 501, available from Air Products and Chemicals, Inc.

In a preferred embodiment a modified amine is present in amounts ranging from 0.025% to 30% weight/weight. More preferably, the modified amine is present in amounts ranging from 0.5% to 20% weight/weight. In a preferred embodiment the modified amine has an equivalent weight of 180. An example of a commercially obtainable modified amine is Ancamine 1767, available from Air Products and Chemicals, Inc.

In a preferred embodiment a standard polyamide is present in amounts ranging from 1% to 25% weight/weight. More preferably, the standard polyamide is present in amounts ranging from 10% to 20% weight/weight. In a preferred embodiment the standard polyamide has an equivalent weight of 100. An example of a commercially obtainable standard polyamide is Ancamide 350A, available from Air Products and Chemicals, Inc.®

In a preferred embodiment a flexible polyamide is present in amounts ranging from 1% to 50% weight/weight. More preferably, the flexible polyamide is present in amounts ranging from 10% to 45% weight/weight. Yet more preferably, the flexible polyamide is present in amounts ranging from 28% to 38% weight/weight. In a preferred embodiment the flexible polyamide has an equivalent weight of 230. An example of a commercially obtainable flexible polyamide is Ancamide 910, available from Air Products and Chemicals, Inc.

In a preferred embodiment a hydrocarbon diluent is present in amounts ranging from 1% to 20% weight/weight. More preferably, the hydrocarbon diluent is present in amounts ranging from 5% to 10% weight/weight. An example of a commercially obtainable hydrocarbon diluent is Epodil L, available from Air Products and Chemicals, Inc.

Suitable epoxy compounds may be saturated or unsaturated, alkyl, arylalkyl or heterocyclic. Representative epoxy compounds include, for example, the diglycidyl ethers of: resorcinol, hydroquinone, 4,4'-isopropylidenediphenol (bisphenol A), 4,4'-dihydroxydiphenylmethane (bisphenol F), 4,4'-dihydroxybenzophenone, 3,3'5,5'-tetrabromo-4,4'-isopropylidenediphenol, 4,4'-thiodiphenol, 4,4'-sulfonyldiphenol, 4,4'-dihydroxydiphenyl oxide, 1,1-bis(4-hydroxyphenyl)-1-phenylethane, 3,3',5,5'-tetrachloro-4,4'-isopropylidenediphenol A, 3,3'-dimethoxy-4,4'-isopropylidenediphenol, 4,4'-dihydroxy-alpha-methylstilbene, 4,4'-dihydroxybenzanilide, 4,4'-dihydroxyazoxybenzene, 4,4'-dihydroxybiphenyl, 4,4'-dihydroxydiphenylazomethine, 4,4'-dihydroxydiphenylacetylene, 4,4'-dihydroxystilbene, 4,4'-dihydroxy-alpha-cyanostilbene, 4,4'-dihydroxyazobenzene, 4,4'-dihydroxyazoxybenzene, 4,4'-dihydroxychalcone, 4-hydroxyphenyl-4-hydroxybenzoate; dipropylene glycol, poly(propylene glycol), thiodiglycol; the triglycidyl ether of tris(hydroxyphenyl)methane; the polyglycidyl ethers of a phenol or alkyl or halogen substituted phenol-aldehyde acid catalyzed condensation product (novolac resins); the tetraglycidyl amines of: 4,4'-diaminodiphenylmethane, 4,4'-diaminostilbene, N,N'-dimethyl-4,4'-diaminostilbene, 4,4'-diaminobenzanilide, 4,4'-diaminobiphenyl, 4,4'-diamino-alpha-methylstilbene; the polyglycidyl ether of the condensation product of: a dicyclopentadiene or an oligomer thereof and a phenol or alkyl or halogen substituted phenol; the advancement reaction products of the aforesaid di and polyglycidyl ethers with aromatic di and polyhydroxyl or carboxylic acid containing compounds including, for example, hydroquinone, resorcinol, catechol, 2,4-dimethylresorcinol, 4-chlororesorcinol, tetramethylhydroquinone, 4,4'-isopropylidenediphenol (bisphenol A), 4,4'dihydroxydiphenylmethane, 4,4'-thiodiphenol, 4,4'-sulfonyldiphenol, 2,2'-sulfonyldiphenol, 4,4'-dihydroxy-diphenyl oxide, 4,4'-dihydroxybenzophenone, 1,1-bis(4-hydroxyphenyl)-1-phenylethane, 4,4'-bis(4(4-hydroxyphenoxy)-phenylsulfone)diphenyl ether, 4,4'-dihydroxydiphenyl disulfide, 3,3',3,5'-tetrachloro-4,4'-isopropylidenediphenol, 3,3',3,5'-tetrabromo-4,4'-isopropylidenediphenol, 3,3'-dimethoxy-4,4'-isopropylidenediphenol, 4,4-dihydroxy-alpha-methylstilbene, 4,4'-dihydroxybenzanilide, bis(4-hydroxyphenyl)terephthalate, N,N'-bis(4-hydroxyphenyl)

terephthalamide, bis(4'-hydroxybiphenyl)terephthalate, 4,4'-dihydroxyphenylbenzoate, bis(4'-hydroxyphenyl)-1,4-benzenediimine; 1,1'-bis(4-hydroxyphenyl)cyclohexane, phloroglucinol, pyrogallol, 2,2',5,5'-tetrahydroxydiphenyl sulfone, tris(hydroxyphenyl)methane, dicyclopentadiene diphenol, tricyclopentadiene diphenol, terephthalic acid, isophthalic acid, 4,4'-benzanilidedicarboxylic acid, 4,4'-phenylbenzoatedicarboxylic acid, 4,4'-stilbenedicarboxylic acid, adipic acid; or any combination thereof.

A heat-activated latent curing agent is present in amounts ranging from 0.05% to 5% weight/weight. In a preferred embodiment the heat-activated latent curing agent is liquid imidazole which is present in amounts ranging from 0.05% to 5% weight/weight. More preferably, the liquid imidazole is present in amounts ranging from 0.1% to 1% weight/weight. The liquid imidazole also acts as an accelerator and affects the glass transition temperature of the cured epoxy. Examples of commercially obtainable liquid imidazoles include Imicure EMI-24, available from Air Products and Chemicals, Inc. Another example of a suitable heat-activated latent curing agent is dicyandiamide. In a preferred embodiment the heat-activated latent curing agent is dicyandiamide which is present in amounts ranging from 0.05% to 5% weight/weight. More preferably, the dicyandiamide is present in amounts ranging from 0.1% to 1% weight/weight. An example of a commercially obtainable dicyandiamide is Amicure CG-NA, available from Air Products and Chemicals, Inc. Particularly preferred is the use of multiple curing agents in a hardener. For example, a liquid imidazole and a dicyandiamide are included together in a hardener component as a first curing agent and a second curing agent. Illustrative examples of curing agents include anionic initiators, cationic initiators, carboxy functionalized polyesters, polyamides, amidoamines, polyamines, melamineformaldehydes, phenol-formaldehydes, urea-formaldehydes, polyphenols, polysulfides, ketimines, novolacs, anhydrides, blocked isocyanates and anhydrides. Most preferred in an inventive curable composition is an amine curing agent.

A reaction accelerator is present in amounts ranging from 0.05% to 10% weight/weight. In preferred embodiments, the reaction accelerator is present in amounts ranging from 2% to 7.5% weight/weight. In a preferred embodiment the reaction accelerator is tri(dimethylaminomethyl)phenol which is present in amounts ranging from 0.05% to 2.0% weight/weight, more preferably from 0.2% to 1.5% weight/weight. An example of a commercially obtainable tri (dimethylaminomethyl)phenol is Ancamine K54, available from Air Products and Chemicals, Inc. Further illustrative examples of reaction accelerators are DMP-30 available from Rhom and Haas, triethanolamine and piperazine. Mixtures of reaction accelerators are suitable for use in an inventive curable composition. For example, Accelerator 399, available from Huntsman, is an advantageous combination of triethanolamine and piperazines.

Fillers are organic or inorganic materials and illustratively include calcium carbonate, alumina trihydrate, barium sulfate, zinc oxide, iron oxide, antimony trioxide, titanium dioxide, cellulose; natural or synthetic fibers such as glass fiber, asbestos fiber, boron fiber and carbon fiber; and silicates such as feldspar, talc, mica, wollastonite, clay, alkyl quaternary ammonium clay, glass and ceramic in forms illustratively including beads and microspheres, and fumed silica. In addition coloring agents illustratively including red oxide, cadmium red, Permanent Red, Lake Red, chromium oxide green, cobalt green, Phthalocyanine Green, ultramarine, Prussian blue, cobalt blue, cerulean blue, Phthalocyanine Blue, cobalt violet, mars violet, Hansa Yellow, Benzidine Yellow, titanium yellow, are fillers.

Single or multiple fillers are present in the material of the present invention and constitutes up to 75% weight/weight of the total formulation. Illustrative examples of commercially available fillers include Cab-O-Sil TS720 available from Cabot Corp., Alcoa C333 available from Aluminum Company of America, Unispar 40 available from Unimin, Inc., Nytal 200 available from R. T. Vanderbilt Company, Inc., Suzorite 200-S available from Zernex-Fabi Benwood, L. L. C., Nyad 475 available from Nyco Minerals, Inc., Thixo-Carb 200 available from Specialty Minerals, Inc., Milled Glass 739 available from Owens Coming, Multiflex MM available from Mineral Technology, Manarch 120 available from Cabot, Scotchlite K46 available from 3M, Huberbrite #10 available from Huber, Mica 20E available from Fibertec, Kronos 2160 available from Kronos, Inc. and Garamite 1958 available from Southern Clay Products, Inc.

It will be evident to one of skill in the art that mixtures of specific components, such as two different curing agents or two types of liquid epoxy resins are suitable for use in an inventive curable composition.

Further examples of epoxies, amines, curing agents, accelerators and other composition components are known in the art as exemplified in May, C. A. (Ed.), Epoxy Resins Chemistry and Technology, Marcel Dekker, New York, 1988; Epoxy Resins, Encyclopedia of Polymer Science and Technology, vol. 6, John Wiley & Sons, Inc., New York, 1994; Ellis, B. (Ed.), Chemistry and Technology of Epoxy Resins, Blackie Academic and Professional, London, 1993; Epoxy Resins, Polymeric Materials Encyclopedia, vol. 3, CRC Press, New York, 1996.

Preferred embodiments of resin and hardener formulations are shown in Examples 1–7.

The resin and hardener components are formulated such that their mixture results in the curable material of the invention. The ratio of resin to hardener will differ depending on the application but will generally range from 0.25:1 to 1:4. In a preferred embodiment the ratio of the resin component to the hardener component is 1:1 weight/weight or volume/volume.

Curing of the Polymeric Material

The mixture of the resin component and the hardener component is cured by a method illustratively including room temperature cure, heat cure and room temperature+heat cure. The material cures at temperatures ranging from 0° C. to 250° C. In a preferred embodiment, the material cures at a temperature of 15° C. to 40° C. In another preferred embodiment, the material cures at higher temperatures, ranging from 40° C. to 250° C. In still another preferred embodiment, the material cures at temperatures ranging from 100° C. to 250° C. The material is also cured at lower temperatures of 15° C. to 40° C. followed by heat treatment at higher temperatures of 40° C. to 250° C. Curing also results when the material is exposed to temperatures of 40° C. to 250° C. followed by exposure to temperatures of 15° C. to 40° C.

The length of exposure to heat which results in curing is variable. The material is exposed to heat for times ranging from 10 minutes to several days and depends on the temperature used. For example, the material is cured at 25° C. for 2–4 days. Further illustrations of cure schedules are found in Table 3.

Adhesion Properties

The material of the present invention adheres to multiple substrates illustratively including E-coated metal, cast iron, aluminum and oily steel such as hot dipped galvanized, electrogalvanized and cold rolled.

The material of the present invention is applied by techniques illustratively including extrusion as a bead, swirl spraying and airless spraying.

The material of the present invention is resistant to corrosion as shown in Table 2. Further advantages of the material include its paintability, resistance to fogging, abrasion and stone chips.

Material can be applied at any stage in automotive applications—examples, body, paint and trim shops.

The resin and hardener components of the material of the present invention have a shelf life of greater than 2 years when not mixed.

Sound Absorption Properties

As shown in Table 5 the material provides uniform sound absorption over a wide temperature range, −20° C. to 60° C.

Material provides improved sound absorption for the same thickness compared to other traditional materials.

Reduction in number of application equipment.

Flexibility

Manufacturing Flexibility

EXAMPLES

Example 1

| Resin | % | Hardener | % |
|---|---|---|---|
| Epoxy Silane | 0.3 | High Molecular Weight | 34.3 |
| Acrylated Urethane Oligomer | 3.2 | Polyether Amine Tri(dimethylaminomethyl) | 0.2 |
| Liquid Epoxy Resin | 28.0 | phenol | |
| Flexible Liquid Epoxy Resin | 1.3 | Epoxy Amine Adduct | 0.2 |
| | | Liquid Imidazole | 0.1 |
| Reactive Flexible Epoxy Diluent | 3.2 | Dicyandiamide | 0.2 |
| | | Feldspar | 60.0 |
| Fumed Silica | 3.5 | Fumed Silica | 5.0 |
| Alumina Trihydrate | 60.5 | Total | 100.0 |
| Total | 100.0 | | |

Example 2

| Resin | % | Hardener | % |
|---|---|---|---|
| Epoxy Silane | 0.3 | High Molecular Weight | 35.0 |
| Acrylated Urethane Oligomer | 3.2 | Polyether Amine Tri(dimethylaminomethyl) | 1.0 |
| Liquid Epoxy Resin | 28.0 | phenol | |
| Flexible Liquid Epoxy Resin | 1.3 | Epoxy Amine Adduct | 1.0 |
| | | Liquid Imidazole | 0.2 |
| Reactive Flexible Epoxy Diluent | 3.2 | Dicyandiamide | 0.3 |
| | | Calcium Carbonate | 57.50 |
| Fumed Silica | 3.5 | Alkyl Quaternary Ammonium Clay | 5.0 |
| Talc | 20.0 | Total | 100.0 |
| Mica | 20.0 | | |
| Wollastonite | 10.0 | | |
| Calcium Carbonate | 10.5 | | |
| Total | 100.0 | | |

Example 3

| Resin | % | Hardener | % |
|---|---|---|---|
| Epoxy Silane | 0.5 | Flexible Amidoamine | 8.0 |
| Acrylated Urethane Oligomer | 3.5 | Flexible Amine Modified Amine | 14.2 5.0 |
| Liquid Epoxy Resin | 25.0 | Hydrocarbon Diluent | 7.8 |
| Flexible Liquid Epoxy Resin | 1.0 | Alkyl Quaternary Ammonium Clay Calcium Carbonate | 5.0 60.0 |
| Reactive Flexible Epoxy Diluent | 6.0 | Total | 100.0 |
| Fumed Silica | 4.0 | | |
| Alumina Trihydrate | 60.0 | | |
| Total | 100.0 | | |

Example 4

| Resin | % | Hardener | % |
|---|---|---|---|
| Epoxy Silane | 0.5 | Standard Polyamide | 15.0 |
| Acrylated Urethane Oligomer | 5.0 | Tri(dimethylaminomethyl) phenol | 1.0 |
| Liquid Epoxy Resin | 20.0 | Modified Amine | 15.0 |
| Flexible Liquid Epoxy Resin | 3.0 | Flexible Amine Alkyl Quaternary Ammonium Clay | 1.0 5.0 |
| Reactive Flexible Epoxy Diluent | 6.0 | Mica Talc | 27.0 16.0 |
| Alkyl Quaternary Ammonium Clay | 5.0 | Wollastonite | 20.0 |
| | | Total | 100.0 |
| Talc | 20.0 | | |
| Mica | 20.0 | | |
| Wollastonite | 10.0 | | |
| Calcium Carbonate | 10.5 | | |
| Total | 100.0 | | |

Example 5

| Resin | % | Hardener | % |
|---|---|---|---|
| Epoxy Silane | 0.5 | Flexible Polyamide | 34.0 |
| Acrylated Urethane Oligomer | 3.5 | Tri(dimethylaminomethyl) Phenol | 0.5 |
| Liquid Epoxy Resin | 25.0 | Epoxy Amine Adduct | 1.0 |
| Flexible Liquid Epoxy Resin | 1.0 | Modified Amine Calcium Carbonate | 1.0 60.0 |
| Reactive Flexible Epoxy Diluent | 6.0 | Fumed Silica | 3.5 |
| Calcium Carbonate | 4.0 | Total | 100.0 |
| Fumed Silica | 60.0 | | |
| Total | 100.0 | | |

Example 6

| Resin | % | Hardener | % |
|---|---|---|---|
| Epoxy Resin | 28.7 | Flexible Amine | 28.7 |
| Flexible Epoxy Resin | 3.6 | Accelerator | 6.0 |
| Urethane Acrylate | 4.2 | Calcium Carbonate | 6.8 |

-continued

| Resin | % | Hardener | % |
|---|---|---|---|
| Fibrous Glass | 1.8 | Titanium Dioxide | 1.4 |
| Calcium Carbonate | 5.3 | Curing Agent | 0.7 |
| Carbon Black | 0.4 | Barytes | 48.4 |
| Glass Bubbles | 1.8 | Treated Mica | 5.0 |
| Barytes | 46.6 | Treated Fumed Silica | 3.0 |
| Treated Mica | 5.0 | Total | 100.0 |
| Treated Fumed Silica | 2.5 | | |
| Total | 100.0 | | |

Example 7

| Resin | % | Hardener | % |
|---|---|---|---|
| NPEL 128 (Nanya) | 28.7 | Jeffamine ® D2000 (Huntsman) | 28.7 |
| Cardolite NC514 (Cardolite) | 3.6 | Accelerator 399 (Huntsman) | 6.0 |
| | | Multifex MM (Mineral Technology) | 6.8 |
| Ebecryl 220 (UCB Chemicals) | 4.2 | | |
| | | Kronos 2160 (Kronos, Inc.) | 1.4 |
| Milled Glass 739 (Owens Corning) | 1.8 | IA-6 (A & C Catalysts) | 0.7 |
| | | Huberbrite #10 (Huber) | 48.4 |
| Multiflex MM (Mineral Technology) | 5.3 | Mica 20E (Fibertec) | 5.0 |
| | | Cabosil TS 720 (Cabot) | 3.0 |
| Manarch 120 (Cabot) | 0.4 | Total | 100.0 |
| Scotchlite K46 (3M) | 1.8 | | |
| Huberbrite #10 (Huber) | 46.6 | | |
| Mica 20E (Fibertec) | 5.0 | | |
| Cabosil TS 720 (Cabot) | 2.5 | | |
| Total | 100.0 | | |

TABLE 1

| Wet Material Properties | Resin | Hardener |
|---|---|---|
| Color | Black | White |
| Specific Gravity (kg/L) | 1.6 | 1.6 |
| % Solids | 99 | 99 |
| Mix Ratio | 1:1 by Volume/by Weight | |
| Pressure Flow Viscosity | | |
| Initial | 10 sec. | 4 sec. |
| 7 days @ 40° C. | 11 sec. | 5.5 sec. |
| Gel Time | | 2 hrs. |
| Working Time | | 1 hr. |

TABLE 2

| Cured Material Properties | |
|---|---|
| Adhesion | Table 3 |
| Sag Properties | Horizontal: 4 mm no sag |
| | Vertical: 4 mm no sag |
| | Invert: 4 mm no sag |
| Flexural Strength | Table 4 |
| Hardness (Shore A) | 76 |
| NVH Properties | Table 5 |
| Corrosion Resistance | |
| Substrate: EG 60 | 30 Cycles APGE* Pass |
| Substrate: E-Coat Steel | 100 Cycles APGE Pass |
| Abrasion Resistance (SAE J400) | Initial Pass, no loss of material |

*1 APGE cycle: 15 minutes 5% salt solution soak, 1 hour 45 minutes drip dry, 22 hours @ 50° C. & 90% RH.

TABLE 3

Lap Shear Adhesion (MPa)

| Test Performed | Shear Adhesion, SAE J1523 |
|---|---|
| Test Temperature | 23 +/− 2° C. |
| Bondline Thickness | 0.25 mm |
| Bond Overlap | 13 mm for Lap Shear Strength |
| Pull Rate | 13 mm/min. for Lap Shear Strength |

| | E-Coat Steel | | Metal Substrates* | |
|---|---|---|---|---|
| Substrate Cure Schedule | 135° C. 20 min. | 176° C. 30 min. | 171° C. 20 min. | 205° C. 40 min. |
| Example 1 | 11.8–12.8 | 12.5–13.5 | 12.5–13.8 | 12.4–13.6 |
| Example 2 | 12.1–14.2 | 12.7–13.6 | 12.7–13.7 | 12.8–13.7 |
| Example 3 | 12.9–14.0 | 13.1–14.9 | 11.9–13.6 | 12.1–13.8 |
| Example 4 | 12.3–14.5 | 12.5–14.8 | 12.0–13.5 | 12.3–14.1 |
| Example 5 | 11.9–12.7 | 12.3–13.9 | 11.7–12.5 | 12.0–13.8 |
| Failure mold | cohesive | cohesive | cohesive | cohesive |

*Metal Substrates include Cold Rolled Steel, Electrogalvanized Steel, Hot Dip Galvanized Steel and Aluminum.

TABLE 4

Flexural Strength
Substrate: Metal Substrates*

| | Flexural Strength (N) | |
|---|---|---|
| Cure Schedule | 171° C., 20 min. | 205° C., 40 min. |
| Example 1 | 45–65 | 45–58 |
| Example 2 | 43–58 | 48–60 |
| Example 3 | 48–60 | 45–62 |
| Example 4 | 50–63 | 47–60 |
| Example 5 | 49–65 | 48–63 |

*Metal Substrates include Cold Rolled Steel, Electrogalvanized Steel, Hot Dip Galvanized Steel and Aluminum.

TABLE 5

COMPOSITE LOSS FACTOR OF MEASURED
AND PREDICTED VALUES OF EXAMPLE 1–5 SAMPLES

| Temp ° C. | Freq (Hz) | Measured 2 mm thick at 20% Mass of Coating/Metal | Predicted 3 mm thick at 25% Mass of Coating/Metal |
|---|---|---|---|
| −20 | 149 | 0.085 | 0.110 |
| −20 | 431 | 0.094 | 0.119 |
| −20 | 847 | 0.106 | 0.134 |
| −20 | 1473 | 0.125 | 0.155 |
| 0 | 121 | 0.084 | 0.127 |
| 0 | 348 | 0.100 | 0.147 |
| 0 | 688 | 0.110 | 0.161 |
| 0 | 1179 | 0.132 | 0.187 |
| 20 | 100 | 0.084 | 0.165 |
| 20 | 287 | 0.093 | 0.175 |
| 20 | 565 | 0.099 | 0.185 |
| 20 | 968 | 0.108 | 0.190 |
| 40 | 89 | 0.050 | 0.095 |
| 40 | 252 | 0.058 | 0.110 |
| 40 | 496 | 0.067 | 0.128 |
| 40 | 839 | 0.078 | 0.149 |
| 60 | 84 | 0.025 | 0.048 |
| 60 | 238 | 0.031 | 0.059 |
| 60 | 467 | 0.036 | 0.069 |
| 60 | 777 | 0.042 | 0.080 |

STEEL OBERST BAR: Total Length 240 mm, Free Length 216 mm, Thickness 1 mm, Width 10 mm Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed is:

1. A curable composition comprising: a resin component and a hardener component wherein the resin component comprises an acrylated urethane oligomer, a flexible liquid epoxy resin and a liquid epoxy resin, and the hardener component comprises an amine.

2. The curable composition of claim 1 wherein the resin component further comprises an epoxy silane.

3. The curable composition of claim 2 wherein the epoxy silane in amounts ranging from 0.05% to 2% of the total weight of the resin component.

4. The curable composition of claim 1 wherein the flexible liquid epoxy resin is present in amounts ranging from 0.5% to 5% of the total weight of the resin component.

5. The curable composition of claim 1 wherein the resin component further comprises a reactive flexible epoxy diluent.

6. The curable composition of claim 5 wherein the flexible liquid epoxy diluent in amounts ranging from 2% to 10% of the total weight of the resin component.

7. The curable composition of claim 1 wherein the resin component further comprises a first filler.

8. The curable composition of claim 7 wherein the first filler is present in amounts ranging from 40% to 75% of the total weight of the resin component.

9. The curable composition of claim 1 wherein the hardener component further comprises a second filler.

10. The curable composition of claim 9 wherein the second filler is present in amounts ranging from 40% to 75% of the total weight of the resin component.

11. The curable composition of claim 1 comprising an acrylated urethane oligomer in amounts ranging from 2% to 15% of the total weight of the resin component.

12. The curable composition of claim 1 comprising a liquid epoxy resin in amounts ranging from 15% to 40% of the total weight of the resin component.

13. The curable composition of claim 1 wherein the amine is a flexible amine.

14. The curable composition of claim 13 wherein the flexible amine is a high molecular weight polyether amine.

15. The curable composition of claim 14 wherein the high molecular weight polyether amine is present in amounts ranging from 20% to 40% of the total weight of the hardener component.

16. The curable composition of claim 1 wherein the amine is selected from the group consisting of: a high molecular weight polyether amine, an epoxy amine adduct, an amidoamine, a flexible amidoamine, a flexible amine, a modified amine, a polyamide, a flexible polyamide and a combination thereof.

17. The curable composition of claim 1 wherein the hardener component further comprises a heat activated latent curing agent.

18. The curable composition of claim 17 wherein the heat activated latent curing agent is present in amounts ranging from 0.05% to 5% of the total weight of the hardener component.

19. The curable composition of claim 1 wherein the hardener component further comprises an accelerator.

20. The curable composition of claim 19 wherein the accelerator is present in amounts ranging from 0.05% to 10% of the total weight of the hardener component.

21. A curable composition comprising: a resin component and a hardener component; the resin component comprising an epoxy resin in amounts ranging from 15% to 40% of the total weight of the resin component, an acrylated urethane oligomer in amounts ranging from 2% to 15% of the total weight of the resin component, a flexible liquid epoxy resin in amounts ranging from 0.5% to 5% of the total weight of the resin component and a first filler in amounts ranging from 40% to 75% of the total weight of the resin component; the hardener component comprising a flexible amine in amounts ranging from 10% to 40% of the total weight of the hardener component, a curing agent in amounts ranging from 0.05% to 5% of the total weight of the hardener component, an accelerator in amounts ranging from 2% to 7.5% of the total weight of the hardener component and a second filler in amounts ranging from 40% to 75% of the total weight of the hardener component.

22. A process for making a cured material which is an interpenetrating network, comprising the steps of:

providing a resin component comprising an acrylated urethane oligomer, a flexible liquid epoxy resin and a liquid epoxy resin;

providing a hardener component comprising an amine;

mixing the resin component and the hardener component to obtain a curable composition; and incubating the curable composition at a temperature for a time sufficient for a cure reaction to occur so as to create an interpenetrating network.

23. A process for making a polymeric material of claim 22 wherein the temperature ranges from 15° C. to 250° C.

24. The process for making a cured material of claim 22 wherein the amine is selected from the group consisting of: a high molecular weight polyether amine, an epoxy amine adduct, an amidoamine, a flexible amidoamine, a flexible amine, a modified amine, a polyamide, a flexible polyamide and a combination thereof.

25. The process of claim 22 wherein the hardener component further comprises an accelerator.

26. The process of claim 22 wherein the hardener component further comprises a heat-activated latent curing agent.

* * * * *